(12) United States Patent
Byrd

(10) Patent No.: US 7,000,712 B2
(45) Date of Patent: Feb. 21, 2006

(54) BEARING SEAL

(75) Inventor: Christopher S. Byrd, Dallas, TX (US)

(73) Assignee: Varel International Ltd., Carrollton, TX (US)

( * ) Notice: Subject to any disclaimer, the term of this patent is extended or adjusted under 35 U.S.C. 154(b) by 0 days.

(21) Appl. No.: 11/019,706

(22) Filed: Dec. 20, 2004

(65) Prior Publication Data

US 2005/0103531 A1 May 19, 2005

Related U.S. Application Data

(63) Continuation of application No. 10/294,056, filed on Nov. 13, 2002, now Pat. No. 6,837,317.

(60) Provisional application No. 60/346,056, filed on Nov. 16, 2001.

(51) Int. Cl.
*E21B 10/00* (2006.01)

(52) U.S. Cl. ........................................ 175/371; 384/94

(58) Field of Classification Search ................ 175/359, 175/371, 372; 384/94; 277/399
See application file for complete search history.

(56) References Cited

U.S. PATENT DOCUMENTS

| | | | |
|---|---|---|---|
| 3,151,691 A | 10/1964 | Goodwin | 384/94 |
| 4,176,848 A | 12/1979 | Lafuze | 277/92 |
| 4,452,539 A | 6/1984 | Evans et al. | 384/94 |
| 4,516,641 A | 5/1985 | Burr | 175/228 |
| 4,762,189 A | 8/1988 | Tatum | 175/371 |
| 4,880,068 A | 11/1989 | Bronson | 175/369 |
| 5,005,989 A | 4/1991 | Karlsson | 384/94 |
| 5,083,499 A | 1/1992 | Elvingsson | 92/193 |
| 5,251,914 A | 10/1993 | Tatum | 277/363 |
| 5,598,895 A | 2/1997 | Anderson et al. | 175/373 |
| 5,655,611 A * | 8/1997 | Dolezal et al. | 175/371 |
| 5,791,421 A * | 8/1998 | Lin | 175/371 |
| 5,842,701 A | 12/1998 | Cawthorne et al. | 277/336 |
| 6,176,331 B1 | 1/2001 | Jin et al. | 175/372 |
| 6,196,339 B1 | 3/2001 | Portwood et al. | 175/371 |
| 6,406,030 B1 | 6/2002 | Fang et al. | 277/407 |
| 6,513,607 B1 | 2/2003 | Peterson et al. | 175/371 |
| 6,837,317 B1 * | 1/2005 | Byrd | 175/371 |
| 2002/0108788 A1 | 8/2002 | Peterson et al. | 175/228 |
| 2003/0029645 A1 | 2/2003 | Mourik et al. | 175/372 |
| 2004/0000435 A1 | 1/2004 | Nguyen | 175/372 |

FOREIGN PATENT DOCUMENTS

| | | |
|---|---|---|
| GB | 2 119 036 A | 11/1983 |
| GB | 2 218 753 A | 11/1989 |

* cited by examiner

*Primary Examiner*—David Bagnell
*Assistant Examiner*—Daniel P Stephenson
(74) *Attorney, Agent, or Firm*—Jenkens & Gilchrist, P.C.

(57) ABSTRACT

A seal assembly for a shaft supporting a rotary element comprises a sealing ring having an inner radial surface in contact with a seal surface of the shaft. The sealing ring comprising a disc shaped integral radial lip normal to the inner radial surface. A disc shaped seal shield is assembled in sealing contact with a first surface of the integral disc shaped radial lip and also in sealing contact with a first radial surface of an annular seal groove. An energizer positioned in the annular seal groove is in contact with the bottom surface of the groove and a second radial surface of the groove. The energizer exerts a radial force on the outer radial surface of the sealing ring and a lateral force on the integral radial lip of the sealing ring.

20 Claims, 3 Drawing Sheets

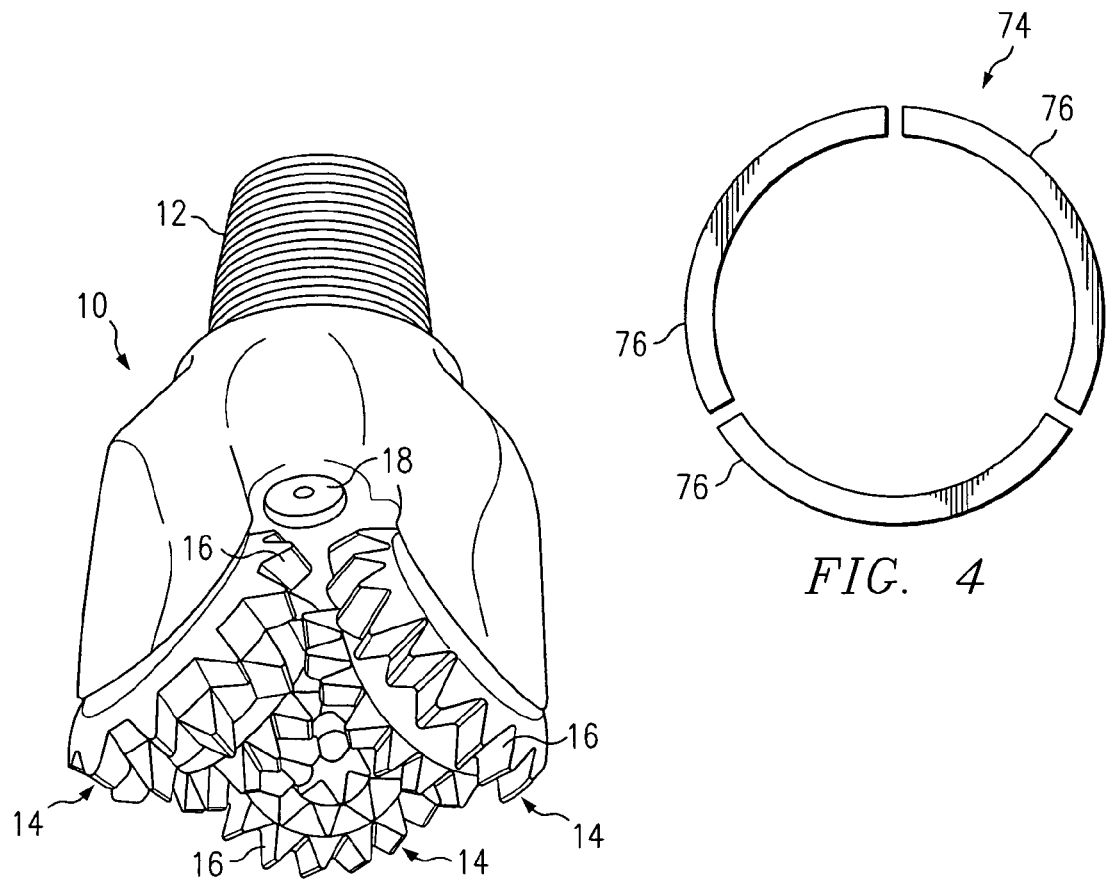
FIG. 1
FIG. 4
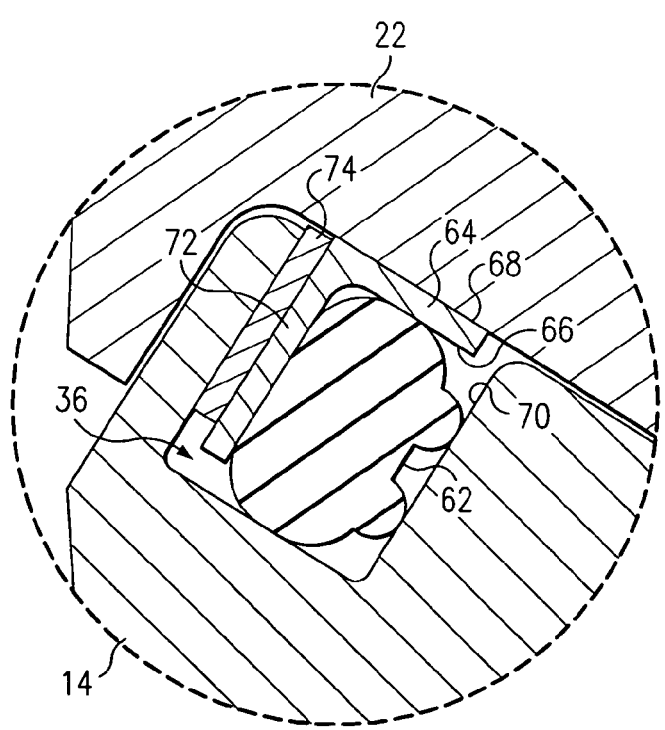
FIG. 3

BEARING SEAL

RELATED APPLICATION

The present application is a continuation of U.S. Ser. No. 10/294,056 filed Nov. 13, 2002, entitled Bearing Seal, now U.S. Pat. No. 6,837,317, which claims the benefit of U.S. provisional application Ser. No. 60/346,056, filed Nov. 16, 2001, entitled Bearing Seal.

TECHNICAL FIELD OF THE INVENTION

This invention relates to bearing seals and, in particular to a bearing seal optimized to minimize the ingress of abrasive particles between bearing surfaces to substantially preclude abrasively wearing the sealing surfaces during operation thereof.

BACKGROUND OF THE INVENTION

A drill bit commonly used in the exploration and recovery of oil, gas and the like to bore through earth formation is the tri-cone rotary drill bit. In use, the tri-cone rotary drill bit is secured to the end of a string of drill pipe which rotates and urges the drill bit against the earth formation. The drill bit includes a drill bit body and a number of substantially conical shaped rock bit cutters rotatably supported by bearings at the pin end of the bit body.

As the drill bit is rotated, the bit cutters bore into the underlying earth formation. Extending radially from each bit cutter are a number of teeth, each having a tip made of diamond or metal that is harder than the underlying earth formation. The bit cutters essentially roll across the underlying earth formation as the bit rotates, causing the teeth extending from the cutter to create a bore hole by impacting and pulverizing the formation. At the same time drilling mud or air is pumped through the drill string and the bit body, around the bit cutters, to cool the cutters, lubricate exterior surfaces of the bit and sweep fragments of the pulverized formation from the cutters back to the surface through the space surrounding the drill string and drill bit.

The bearings supporting the rock bit cutter are protected from the highly abrasive mixture of drilling mud or air and cuttings, which would otherwise quickly destroy the bearings, by a bearing assembly that includes a bearing seal. Typically, bearing seals comprise an O-ring or a Belleville spring covered within an elastomeric material. The seal is positioned about the bearing surface and compressed between the bearing surface of the bit body and the bearing surface of the bit cutter to form a barrier against intrusion of drilling mud, air and cuttings.

Early Belleville spring seals for tri-cone rock bits were designed with a metallic Belleville spring clad with an elastomer, usually nitrile rubber. The metallic Belleville spring provided the energizing force for engaging the sealing surface, and the rubber coating sealed against the bearing surface of the bit body and the bearing surface of the bit cutters. This provided a seal on relatively rough surfaces because the compliant behavior of the rubber coating filled in the microscopic asperities on the sealing surface. The seal would fail after a relatively short number of hours in operation due to wear of the elastomer, resulting in loss of lubricant contained within the bearing cavity. The bit would continue to function for some period of time utilizing bearings without benefit of the lubricant.

While O-ring type seal assemblies have improved the operation of the typical rotating cutter drill bit, the seal assembly has an effective service life typically within the range of 100–200 hours of drilling. The seal assembly will degrade and permit drilling mud and other fluids present about the drill bit to enter the bearing assembly. Once the bearing assembly is contaminated, the service life of the drill bit is very short. The drilling mud and other fluids about the drill bit commonly contain impurities which quickly abrade the bearing surfaces of the bearing assembly.

However, a significant advancement in rock bit seals came when O-ring type seals were introduced. These seals were composed of nitrile rubber and generally had a circular cross-section. The seal was fitted into the radial gland formed by the cylindrical surfaces between the pin end and the cutter bearing. The annulus formed was smaller than the original measured dimension of the cross-section of the O-ring seal. The squeeze of the seal was defined as the percentage reduction of the cross-section from its original shape to the deflected shape.

A variation of the conventional O-ring seal was an elongation of the radial dimension which, when compared with the O-ring seal, required less percentage squeeze to form an effective seal. Several other minor variations of the O-ring seal have been used, each relying on an elastomer seal squeezed radially in a gland formed by surfaces between the two bearing elements.

There are drawbacks to the conventional O-ring seal. As mentioned, the dynamic sealing component is composed of either nitrile rubber or hydrogenated nitrile rubber compounds. This material imparts a very high coefficient of friction when moving against steel or other metallic surfaces. This high friction characteristic causes the seal to generate heat, thereby raising the temperature of the rubber and reduces the physical properties of the materials, causing accelerated wear of the seal. An additional shortcoming of the conventional O-ring seal design is that the positive nature of the seal acts to prevent lubricant from getting to the seal interface during operation. The seal is lubricated during installation, and when this initial lubricant is expended, little or no additional lubrication of the seal interface is possible. Dry friction between the seal interface with the bearing gland acts to accelerate the wear of both the seal and the gland material, causing loss of the required squeeze to maintain effective sealing. To overcome this dry interface problem internal lubricants, such as graphite, have been blended into the seal compound to provide lubrication of the seal interface after the installation lubricant is expended.

SUMMARY OF THE INVENTION

In accordance with the present invention the previous shortcomings with Belleville spring seals and O-ring seals are addressed by utilization of a first material for energizing the seal and a second material for effecting the seal interface. Each component material is optimized for the specific properties required for its function. The result is a bearing seal that provides a mechanism for minimizing the ingress of fine rock particles and therefore substantially precludes such particles from abrasively wearing the sealing surface during operation of the drill bit. In addition, a bearing seal in accordance with the present invention provides a mechanism for importing lubricant to the seal interface during operation, thereby improving lubrication of the seal surface and providing longer useful life of the bearing surfaces.

A seal assembly for a shaft supporting a rotary element in accordance with the present invention comprises a sealing ring having an inner radial surface in contact with a seal surface, the sealing ring comprising an integral radial lip. A disc shaped seal shield is assembled in sealing contact with a first surface of the integral radial lip and also in sealing contact with a first radial surface of an annular seal groove. An energizer is assembled in the annular seal groove in contact with the bottom surface of the seal groove and a second radial surface of the seal groove. The second radial surface is axially opposite from the first radial surface. The energizer exerts a radial force on an outer radial surface of the sealing ring and a lateral force on the integral radial lip of the sealing ring.

There is substantially no relative motion between the energizer and other components of the seal assembly in contact with the energizer so rubbing surfaces are not considered essential in selection of a material for the energizer. The preferred material for the energizer is hydrogenated nitrile rubber (HNBR) because of its low compression set, high resilience, and high potential strength.

The sealing ring of the seal assembly of the present invention is in contact with and energized by the energizer. The sealing ring is in sliding contact with the seal gland surface of the pin end bearing, and all relative motion between the seal gland and the seal surface of the sealing ring occurs at this juncture. The sealing ring comprises a material having surface properties of lubricity, resistance to chemical attack, resistance to thermal degradation, and resistance to abrasive wear.

A technical advantage of the present invention is a bearing seal comprising materials having desirable surface properties. These surface properties characterize the performance of the seal interface with the steel of the bearing surface. The core properties of the material characterize the ability of the seal to energize the sealing interface. Another advantage of the bearing seal of the present invention is a seal assembly that minimizes the possibility of fine abrasives to work under the seal and abrade the sealing surface. A still further technical advantage of the present invention is a bearing seal utilizing different materials for energizing the seal and effecting the seal interface. Each component material is optimized for specific properties functional requirements. The seal assembly provides a mechanism for minimizing the ingress of fine rock particles and therefore substantially precludes these fine rock particles from abrasively wearing the sealing surface in operation. Further, the seal assembly of the present invention provides a mechanism for imparting lubricant to the sealing interface during operation, thereby improving lubrication of the seal interface and providing longer useful life of the protected bearing surfaces.

BRIEF DESCRIPTION OF THE DRAWINGS

A more complete understanding of the invention may be had by reference to the following detailed description when taken in conjunction with the accompanying drawings, wherein:

FIG. 1 is a perspective view of a typical tri-cone rotary drill bit;

FIG. 3 is a magnified view of a portion of the rotary drill bit of FIG. 2 enclosed by a broken circle FIG. 3, illustrating the seal assembly of the present invention;

FIG. 4 is a plan view showing one embodiment of the seal shield of the seal assembly of FIG. 3.

DETAILED DESCRIPTION OF THE DRAWINGS

Figure 2:
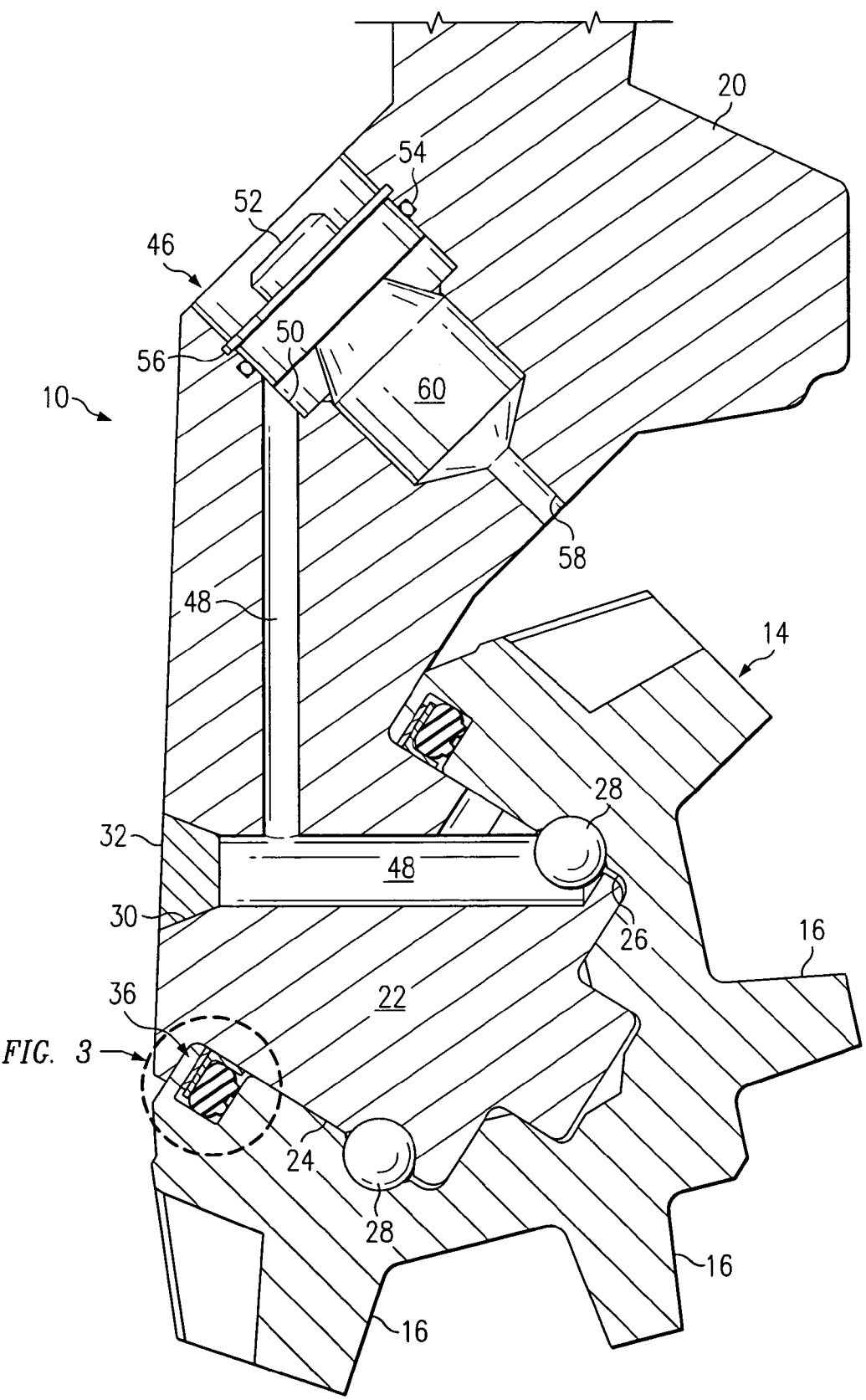
FIG. 2 is a partial sectional view of the rotary drill bit shown in FIG. 1, illustrating a bit cutter, bearing assembly, seal assembly and a portion of the bit body.

Referring now to the drawings, wherein like reference characters designate like or corresponding parts throughout the several views, a rotary cutter drill bit 10 typical of those currently used in drilling operations is illustrated in FIGS. 1 and 2. The drill bit 10 is designed for threaded engagement with a drill string through a threaded portion 12. The drill string (not shown) extends to the earth surface and is rotated by a conventional power source.

The drill bit 10 has three rotary cutters 14 rotatably secured thereon. The rotary cutters have cutting structure 16 either cast into the surface of the cutter or tungsten carbide inserts. The drill bit 10 illustrated in FIG. 1 includes three rotary cutters positioned at 120 degree angles about the circumference of the bit. However, any number of rotary cutters can be provided for a particular application.

The drill string transmits a downward force urging the cutting structure 16 of the rotary cutters 14 against the cutting face of the bore hole being drilled. The cutting structure 16 pulverizes the rock or other material on the cutting face and breaks it into very small pieces. Drilling fluid is pumped through the hollow inner core of the drill string and through a nozzles 18 (only one shown) in the drill bit to impact upon the cutting face. The drilling fluid entrains the particles pulverized by the cutting structure 16 and flows upward to the surface about the annular space between the bore hole and the drill string to carry the pulverized material to the surface for disposal. The drilling fluid entrained with the pulverized particles creates an abrasive environment around the drill bit 10. It is this abrasive environment that requires the use of a seal assembly to protect the bearing surfaces of the rotary cutters.

As best illustrated in FIG. 2, the drill bit 10 includes a drill bit body 20 having three extending pins 22 (only one shown). The pins include a bearing surface 24 extending circumferentially about the pin 22. A similar bearing surface 26 is formed within a cylindrical aperture in the rotary cutter 14. The rotary cutter 14 is positioned so that the bearing surface 26 is aligned with the pin extending into the cylindrical aperture thereof. Ball bearings 28 are positioned in rolling contact with an annular groove to rotatably secure the rotary cutter 14 to the pin 22. The ball bearings 28 are entered through an aperture 30 formed in the drill bit body and through a hollow center core in the pin. After filling the annular groove with ball bearings a plug 32 is welded in the aperture 30 to prevent contamination from reaching the bearing surfaces between the rotary cutter 14 and the pin 22.

An annular bushing (not shown) is positioned between the rotary cutter and is embedded in the outer surface of the pin 22. The bushing and ball bearings 28 combine with the rotary cutter 14 and pin 22 to form a bearing assembly capable of withstanding the great stresses encountered in drilling.

A seal assembly 36 in accordance with the present invention is provided which acts to isolate the bearing assembly from the environment surrounding the drill bit. The seal assembly 36 permits the bearing assembly to be filled with a permanent lubricant to enhance the service life of the drill bit.

A pressure compensating assembly 46 is provided in the drill bit body 20 to maintain the pressure differential across the seal assembly 36 below a predetermined level. A port 48 is formed in the drill bit interconnecting the seal assembly 36 with a cavity 50. One end of the cavity 50 is sealed from the environment about the drill bit 10 by a cap 52 that is sealed within the cavity by an O-ring 54 and locking ring 56. The opposite end of the cavity 50 communicates to the exterior of the drill bit through port 58. A flexible diaphragm 60 is secured within the cavity 50. The side of the flexible diaphragm 60 in communication with the port 48 is filled with lubricant. The port 58 communicates with the opposite side of the diaphragm 60 to permit communication to the environment surrounding the drill bit 10. The diaphragm 60 maintains the pressure on either side of the bearing assembly in equilibrium, transmitting the pressure exterior of the drill bit 10 through the port 48 to the bearing assembly. This results in a pressure differential across the seal assembly 36 maintained below a predetermined level.

Referring to FIGS. 2 and 3, there is shown a preferred embodiment of the seal assembly 36 in accordance with the present invention. The seal assembly 36 utilizes three components, although it should be understood that the seal assembly will function utilizing only two of the three components. An energizer 62 having a basic configuration in the form of an O-ring provides the sealing force for the seal assembly 36. The energizer 62 is preferably manufactured from a material resistant to compression set, tensile strength, and resiliency. The preferred material for the energizer 62 is hydrogenated nitrile rubber (HNBR) because of its low compression set, high resilience, and high tensile strength.

In accordance with the present invention, the energizer 62 has substantially no relative motion between the energizer and other components of the seal assembly 36 in contact with the energizer. This lack of relative motion enables use of a material that provides enhanced energizing of a sealing interface.

The second component of the seal assembly 36 is a seal ring 64 having an outer radial surface 66 that is in contact with and energized by the energizer 62. The inner radial surface 68 of the seal ring 64 is in sealing contact with the seal gland surface of the bearing pin 22. As mentioned, there is substantially no relative motion between the seal ring 64 and the energizer 62. The seal ring 64, however, is in sliding contact with the seal gland surface of the bearing pin 22 and is the seal interface of the seal assembly 36. In the embodiment of FIGS. 2 and 3, all relative motion between the seal gland surface of the bearing pin 22 and the seal assembly 36 takes place between the seal ring 64 and the seal gland surface. The preferred material for the seal ring 64 is a compound having high lubricity, high thermal stability, resistance to chemical attack, and resistance to abrasive wear.

As noted previously, the seal assemblies employed in previous drill bits have degraded after approximately 100–200 hours of drilling operation. Contributing to the rapid degradation of the seal is the drilling environment which often includes fluids that are almost always effective electrolytes that accelerate the process of corrosion of sealing surfaces. Such substances include sodium chloride and hydrogen sulfide. Other conditions contributing to rapid degradation of a seal assembly are the elevated temperatures in deep wells and in geothermal wells. A high hydrostatic pressure within the well also increases seal wear.

In addition, the drilling mud or fluid passing around the drill bit to remove cuttings is traveling at a very high velocity and contributes to rapid degradation of previous seals for drill bits. The drilling fluid is ladened with abrasive cuttings which continuously scour the surfaces of the drill bit. Thus, the seal ring 64 having material properties such as lubricity, resistance to chemical attack, resistance to thermal degradation and resistance to abrasive wear enhances the performance of the seal assembly 36. The preferred material for the seal ring 64 is a PTFE compound re-enforced with carbon or other fibers to give the necessary abrasive wear resistance.

The seal ring 64 and the energizer 62 are fitted into a groove 70 of the rotary cutter 14. When installed in the groove 70 between a first radial wall of the groove and the seal ring 64 the energizer 62 is deflected radially from its original dimension to impart a radial sealing force to the seal ring 64. The relaxed diameter of the seal ring 64 enables a slip fit onto the seal gland surface of the bearing pin 22.

Also forming part of the seal ring 64 is an integral disc-shaped radial lip 72 resulting in the sealing ring having a right angle configuration with a corner open to the drilling environment. The disc-shaped radial lip 72 of the seal ring 64 is disposed to bridge the gap between the seal gland surface of the bearing pin 22 and the bearing surface of the cutter 14 thereby closing the bearing cavity from the environment surrounding the drill bit.

A third component of the seal assembly 36 is a metallic seal shield 74 also illustrated in FIG. 4. As illustrated in FIG. 4, the metallic seal shield 74 comprises three segments 76 and has a disc shaped configuration. The preferred material for the metallic seal shield 74 is a corrosion resistance material such as stainless steel. The seal shield 74 is assembled in the groove 70 between a second radial surface of the groove and the radial lip 72 of the seal ring 64. The seal shield 74 has an inside diameter that closely fits the diameter of the seal gland surface of the bearing pin 22 and results in a small gap between the inner diameter of the shield and the seal gland surface of the bearing pin 22. During operation of the drill bit 10, there is relative radial movement between the bearing pin 22 and the bearing surface of the cutter 14, however, the seal shield 74 remains relatively concentric with a small gap maintained between the outer diameter of the shield and the sealing surface of the pin 22. The function of the seal shield 74 is to reduce the gap to be spanned by the seal ring 64, and to protect the seal ring from wear by fine, abrasive particles entering the seal cavity.

The amount of force holding the seal shield 74 in place in the groove 70 is controlled by the amount of lateral (axial with respect to the cutter 22) squeeze imparted by the energizer 62. This positive force enables the seal shield 74 and the radial lip 72 of the seal ring 64 to be held in place to preclude the ingress of abrasive particles into the seal cavity, but not so tightly as to cause the seal components to plastically deform and be extruded out of the seal cavity.

The geometry of the seal ring 64, when viewed from the lubrication side of the seal assembly 36, enables lubricant to be forced between the seal ring and the seal gland surface of the bearing pin 22 when pressure surges develop in the lubricant system of the drill bit. Such pressure surges commonly exist when the weight is suddenly applied to the drill bit 10 after an additional length of pipe has been added to the drill string and drilling is resumed.

Figure 5:
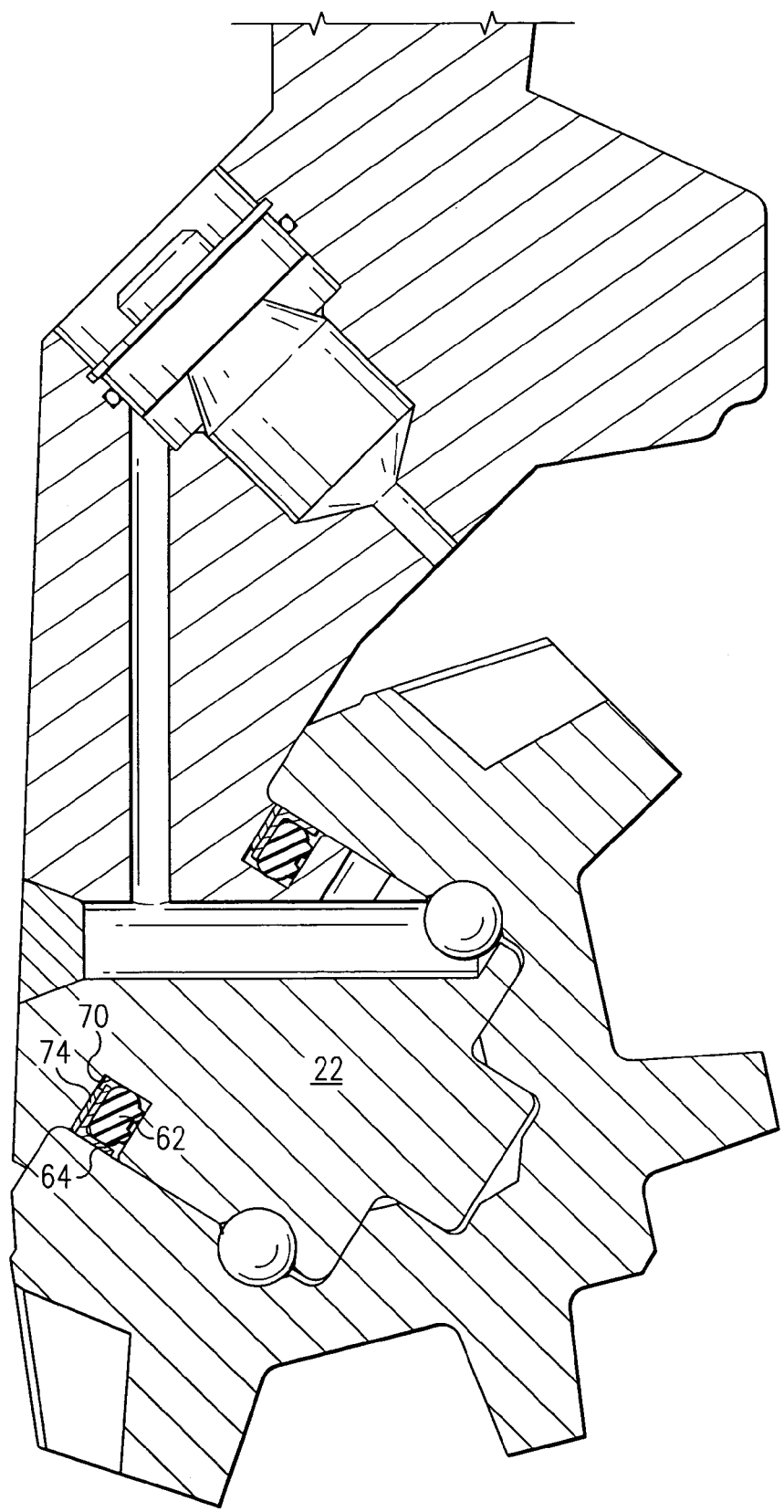
FIG. 5 is a partial sectional side view of the rotary drill bit shown in FIG. 1 illustrating an alternate embodiment of the seal assembly in accordance with the present invention.

Referring to FIG. 5, there is shown an alternate embodiment of the seal assembly of the present invention wherein the seal cavity groove 70 is formed in the seal gland surface of the bearing pin 22. Other than for the location of the seal cavity groove 70 the drill bit of FIG. 5 is substantially the same as the drill bit illustrated and described with reference to FIG. 2. The energizer 62 is assembled within the groove 70 to exert a radial and lateral squeeze on the seal ring 64. The seal shield 74 is located between the radial lip of the seal ring 64 and a second radial surface of the groove 70.

In the embodiment of the seal assembly 36 of FIGS. 2 and 3 the seal interface formed by the seal ring 64 was the contact with the seal gland surface of the bearing pin 22. In the embodiment of FIG. 5 the seal interface formed by the seal ring 64 is with the bearing surface of the cutter 14. Other than the difference in the seal interface between the embodiment of FIG. 2 and the embodiment of FIG. 5 the seal assembly 36 in both embodiments is substantially the same. Of course, dimensionally the components of the seal assemblies of the disclosed embodiment will be controlled by the dimensions of the seal cavity groove 70 and the related seal surface.

Although the seal assembly of the present invention has been illustrated and described with reference to earth boring bits, other applications of the seal assembly are within the scope of the invention. Thus, the seal assembly may be utilized on other earth boring components utilizing sealed, permanently lubricated bearings of either the roller type or journal type (friction type) to rotatably mount one or more movable elements. The seal assembly minimizes the ingress of fine abrasive particles and other debris into the seal cavity by means of energizing the seal ring 64. Thus, the seal assembly illustrated and described finds utility to seal lubricated bearings in boring machines such as rock bits, hole openers, shaft boring cutters, and other oil field tools. Additional utilization of the seal assembly of the present invention will be recognized by those skilled in the art of seal assemblies.

While several embodiments of the invention have been illustrated in the accompanying drawings and described in the foregoing detailed description, it will be understood that the invention is not limited to the embodiments disclosed, but is capable of numerous rearrangements, modifications and substitutions of parts and elements without departing from the spirit of the invention.

What is claimed is:

1. A seal assembly for a shaft supporting a rotary element, comprising:
   a sealing ring in an annular seal groove of the shaft and having a first radial surface in contact with a seal surface of the rotary element, the sealing ring comprising an integral disc-shaped radial lip;
   a disc shaped seal shield in contact with a first surface of the integral disc-shaped radial lip and also in sealing contact with a first radial surface of the annular seal groove of the shaft; and
   an energizer in the annular seal groove of the shaft in contact with a bottom surface of the seal groove and a second radial surface of the sealing ring, the second radial surface opposite from a first radial surface of the sealing ring.

2. The seal assembly as in claim 1 wherein the energizer comprises a material resistant to compression set, exhibits a high resilience, and has a high tensile strength.

3. The seal assembly as in claim 1 wherein the energizer exerts a radial force on the second radial surface of the sealing ring and a lateral force on the integral disc shaped radial lip of the sealing ring.

4. The seal assembly as set forth in claim 1 wherein the sealing ring comprises a material having surface properties of lubricity, resistance to chemical attack, resistance to thermal degradation, and resistance to abrasive wear.

5. The seal assembly as in claim 2 wherein the material of the energizer comprises a hydrogenated nitrile rubber.

6. The seal assembly as in claim 3 wherein the force exerted by the energizer on the sealing ring and the seal shield minimizes movement between the sealing ring, the seal shield and the first radial surface of the annular groove.

7. The seal assembly as in claim 4 wherein the material of the sealing ring comprises a PTFE compound reinforced with fibers for abrasive wear resistance.

8. A drill bit comprising:
   a body having a cutter support pin and defining a sealing surface;
   a cutter having cutter cutting structure thereon and defining a sealing surface;
   a bearing assembly for rotatably supporting the cutter on the cutter support pin of the body; and
   a seal assembly comprising:
      a sealing ring having an outer radial surface in contact with a seal surface of the cutter, the sealing ring comprising an integral radial lip;
      an energizer in an annular seal groove and in contact with a bottom surface of the seal groove and a second radial surface of the seal groove, the second radial surface axially opposite from a first radial surface in contact with the sealing ring; and
      a disc shaped seal shield in sealing contact with a first surface of the integral radial lip and also in sealing contact with a first radial surface of the annular seal groove.

9. The drill bit as in claim 8 wherein the energizer comprises a material resistant to compression set, exhibits a high resilience, and has a high tensile strength.

10. The drill bit as in claim 8 wherein the sealing ring comprises a material having surface properties of: lubricity, resistance to chemical attack, resistance to thermal degradation, and resistance to abrasive wear.

11. The drill bit as in claim 8 further comprising a flexible diaphragm in fluid communication with an environment surrounding the body and with fluids within the body, the flexible diaphragm operable to maintain a differential pressure between the environment surrounding the body and the fluids within the body below a predetermined level.

12. The drill bit as in claim 8 wherein the energizer exerts a radial force on an inner radial surface of the sealing ring and a lateral force on the integral disc shaped radial lip of the sealing ring.

13. The drill bit as in claim 12 wherein the force exerted by the energizer on the sealing ring and the seal shield minimizes movement between the sealing ring, the seal shield and the first radial surface of the annular groove.

14. A drill bit comprising:
   a body having a cutter support pin and defining a sealing surface;
   a cutter having cutting structure thereon and defining a sealing surface;
   a bearing assembly for rotatably supporting the cutter on the cutter support pin of the body; and
   a seal assembly comprising:
      a sealing ring in an annular seal groove of the cutter support pin and having a first radial surface in contact with a seal surface of the cutter, the sealing ring comprising an integral disc-shaped radial lip;
      a disc shaped seal shield in contact with a first surface of the integral disc-shaped radial lip and also in sealing contact with a first radial surface of the annular seal groove of the cutter support pin; and
      an energizer in the annular seal groove of the cutter support pin in contact with a bottom surface of the seal groove and a second radial surface of the sealing ring, the second radial surface opposite from a first radial surface of the sealing ring.

15. The drill bit as in claim 14 wherein the energizer exerts a radial force on an inner radial surface of the sealing ring and a lateral force on a second surface of the integral disc-shaped radial lip of the sealing ring.

16. The drill bit as in claim 15 wherein the force exerted by the energizer on the sealing ring and the seal shield minimizes movement between the sealing ring, the seal shield and the first radial surface of the annular seal groove.

17. The drill bit as in claim 15 wherein the energizer comprises a material resistant to compression set, exhibits a high resiliency, and has a high tensile strength.

18. The drill bit as in claim 15 wherein the sealing ring comprises a material having surface properties of: lubricity, resistance to chemical attack, resistance to thermal degradation, and resistance to abrasive wear.

19. The drill bit as in claim 15 wherein the energizer comprises PTFE compound re-enforced with carbon fibers.

20. The drill bit as in claim 15 further comprising a flexible diaphragm in fluid communication with the environment surrounding the body and with fluids within the body, the flexible diaphragm operable to maintain a differential pressure between the environment surrounding the body and the fluids within the body below a predetermined level.

* * * * *